United States Patent
Lyu et al.

(10) Patent No.: US 11,670,286 B2
(45) Date of Patent: Jun. 6, 2023

(54) TRAINING MECHANISM OF VERBAL HARASSMENT DETECTION SYSTEMS

(71) Applicant: Beijing DiDi Infinity Technology and Development Co., Ltd., Beijing (CN)

(72) Inventors: Ying Lyu, Santa Clara, CA (US); Kun Han, Sunnyvale, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 174 days.

(21) Appl. No.: 17/135,651

(22) Filed: Dec. 28, 2020

(65) Prior Publication Data

US 2021/0201892 A1     Jul. 1, 2021

Related U.S. Application Data

(60) Provisional application No. 62/955,895, filed on Dec. 31, 2019.

(51) Int. Cl.
*G10L 15/06*     (2013.01)
*G10L 15/08*     (2006.01)
(Continued)

(52) U.S. Cl.
CPC .............. *G10L 15/063* (2013.01); *G06N 3/08* (2013.01); *G06N 20/00* (2019.01); *G10L 15/083* (2013.01);
(Continued)

(58) Field of Classification Search
CPC ..... G10L 15/063; G10L 15/083; G10L 15/26; G10L 25/63; G10L 2015/088; G06N 3/08;
(Continued)

(56) References Cited

U.S. PATENT DOCUMENTS 9,703,872 B2 *    7/2017    Spears ................ G06F 16/9535
10,222,942 B1      3/2019    Zeiler et al.
(Continued)

FOREIGN PATENT DOCUMENTS

CN        109256150 A   *   1/2019          G10L 17/00
CN        110309293 A   *   10/2019
(Continued)

OTHER PUBLICATIONS

Balci, et al. Automatic analysis and identification of verbal aggression and abusive behaviors for online social games, https://reader.elsevier.com/reader/sd/pii/S0747563214005482 pp. 517-526 (2015).

(Continued)

*Primary Examiner* — Bhavesh M Mehta
*Assistant Examiner* — Philip H Lam
(74) *Attorney, Agent, or Firm* — Knobbe, Martens, Olson & Bear, LLP

(57) ABSTRACT

In some cases, lower quality, large scale training data can be automatically generated by automatic labeling. The generated training data can be used to pre-train a machine learning model. For instance, the model can be a model for detection of verbal harassment. Parameters of the pre-trained model can be refined or updated using another one or more higher-quality sets of training data, with which the model can be subsequently trained.

20 Claims, 9 Drawing Sheets

(51) Int. Cl.
   *G10L 15/26* (2006.01)
   *G06N 20/00* (2019.01)
   *G06N 3/08* (2023.01)
   *G10L 25/63* (2013.01)

(52) U.S. Cl.
   CPC .............. *G10L 15/26* (2013.01); *G10L 25/63* (2013.01); *G10L 2015/088* (2013.01)

(58) Field of Classification Search
   CPC ........ G06N 20/00; G06N 5/003; G06N 7/005; G06N 3/0454; G06N 3/045; G06N 5/01; G06N 7/01; G06F 40/216; G06F 40/30; G06Q 50/265
   See application file for complete search history.

(56) References Cited

U.S. PATENT DOCUMENTS

| | | | |
|---|---|---|---|
| 10,453,453 | B2 | 10/2019 | Penilla et al. |
| 10,460,600 | B2 | 10/2019 | Julian et al. |
| 10,592,757 | B2 | 3/2020 | el Kaliouby et al. |
| 11,170,064 | B2 | 11/2021 | David |
| 11,195,542 | B2 | 12/2021 | Zass |
| 11,330,009 | B2 | 5/2022 | Liu et al. |
| 11,354,900 | B1* | 6/2022 | Li ..................... G06T 7/0002 |
| 11,409,963 | B1 | 8/2022 | Nagula |
| 2002/0099730 | A1 | 7/2002 | Brown et al. |
| 2015/0309987 | A1* | 10/2015 | Epstein ............... G06F 40/30 704/9 |
| 2015/0310352 | A1 | 10/2015 | Kyaw |
| 2018/0001899 | A1 | 1/2018 | Shenoy et al. |
| 2018/0232511 | A1 | 8/2018 | Bakish |
| 2019/0376803 | A1 | 12/2019 | Kotake et al. |
| 2020/0125639 | A1* | 4/2020 | Doyle ................. G06F 40/30 |
| 2020/0159601 | A1 | 5/2020 | Asmussen et al. |
| 2020/0349666 | A1 | 11/2020 | Hodge |
| 2021/0086778 | A1 | 3/2021 | Suthar et al. |
| 2021/0191398 | A1 | 6/2021 | Chen et al. |
| 2021/0201891 | A1 | 7/2021 | Lyu et al. |
| 2021/0201893 | A1 | 7/2021 | Lyu et al. |
| 2021/0201934 | A1 | 7/2021 | Lyu et al. |

FOREIGN PATENT DOCUMENTS

| | | |
|---|---|---|
| DE | 10311587 | 9/2004 |
| JP | 2019-095552 | 6/2019 |
| KR | 10-2011-0010179 | 2/2011 |
| KR | 10-2017-0058885 | 5/2017 |
| KR | 10-2019-0100669 | 8/2019 |
| WO | WO 2017/130122 | 8/2017 |
| WO | WO 2021/138316 | 7/2021 |
| WO | WO 2021/138320 | 7/2021 |
| WO | WO 2021/138341 | 7/2021 |

OTHER PUBLICATIONS

Gunasekara, et al., A review of standard text classification practices for multi-label toxicity identification of online content, https://www.aclweb.org/anthology/W18-5103.pdf pp. 21-25 (2018).

Search Report and Written Opinion issued in PCT/US2020/067308 dated Apr. 16, 2021.

Chan et al., "Listen, Attend and Spell: A Neural Network for Large Vocabulary Conversational Speech Recognition", 2016 IEEE International Conference on Acoustics, Speech and Signal Processing (ICASSP), 2016, pp. 4960-4964.

Chorowski et al., "Attention-Based Models for Speech Recognition" NIPS, 2015, in 9 pages.

Craven et al., "Constructing biological knowledge bases by extracting information from text sources", ISMB, vol. 1999, pp. 77-86. 1999.

Dalvi et al., "Aggregating crowdsourced binary ratings", Proceedings of the 22nd international conference on World Wide Web, ACM, 2013, pp. 285-294.

Devlin et al., "BERT: Pre-training of Deep Bidirectional Transformers for Language Understanding", arXiv preprint arXiv:1810.04805, 2018, in 14 pages.

FastText, retrieved from <https://fasttext.cc/> on Dec. 23, 2020 in 4 pages.

Graves et al., "Connectionist Temporal Classification: Labelling Unsegmented Sequence Data with Recurrent Neural Networks",ICML 2006—Proceedings of the 23rd International Conference on Machine Learning, 2006, pp. 369-376.

Han et al., "Speech Emotion Recognition Using Deep Neural Network and Extreme Learning Machine", Interspeech 2014, pp. 223-227.

Hinton et al., "Deep Neural Networks for Acoustic Modeling in Speech Recognition", IEEE Signal Processing Magazine, Nov. 2012, pp. 82-97.

Howard et al., "Universal language model fine-tuning for text classification", arXiv preprint arXiv:1801.06146 (2018).

International Search Report and Written Opinion in International Application No. PCT/US2020/067303, dated Apr. 16, 2021 in 7 pages.

International Search Report and Written Opinion in International Application No. PCT/US2020/067309, dated Apr. 19, 2021 in 7 pages.

International Search Report and Written Opinion in International Application No. PCT/US2020/067336, dated Apr. 7, 2021 in 11 pages.

Joglekar et al., "Comprehensive and reliable crowd assessment algorithms", 2015 IEEE 31st International Conference on Data Engineering, IEEE, 2015, pp. 195-206.

Kim, "Convolutional neural networks for sentence classification", arXiv preprint arXiv:1408.5882 (2014).

Lai et al., "Recurrent convolutional neural networks for text classification", Twenty-ninth AAAI conference on artificial intelligence, 2015.

Liu et al., "SafeShareRide: Edge-Based Attack Detection in Ridesharing Services," 2018 IEEE/ACM Symposium on Edge Computing (SEC), 2018, pp. 17-29.

Mikolov et al., "Distributed Representations of Words and Phrases and their Compositionality", Advances in Neural Information Processing Systems, 2013, pp. 1-9.

Mintz et al., "Distant supervision for relation extraction without labeled data", Proceedings of the Joint Conference of the 47th Annual Meeting of the ACL and the 4th International Joint Conference on Natural Language Processing of the AFNLP: vol. 2-vol. 2, Association for Computational Linguistics, 2009, pp. 1003-1011.

Pan et al., "Speech Emotion Recognition Using Support Vector Machine", International Journal of Smart Home, vol. 6, No. 2, Apr. 2012, pp. 101-108.

Pan et al., "A Survey on Transfer Learning" IEEE Transactions on Knowledge and Data Engineering 22 (10). IEEE, 2010, pp. 1345-1359.

Peters et al., "Deep contextualized word representations" arXiv preprint arXiv:1802.05365 (2018) in 15 pages.

Rabiner, "A Tutorial on Hidden Markov Models and Selected Applications in Speech Recognition", Proceedings of the IEEE, vol. 77, No. 2, Feb. 1989, pp. 257-286.

Ratner et al., "Data programming: Creating large training sets, quickly", Advances in neural information processing systems, 2016, pp. 3567-3575.

Ratner et al., "Snorkel: Rapid training data creation with weak supervision", Proceedings of the VLDB Endowment 11, No. 3, 2017, pp. 269-282.

Schuller et al., "Hidden Markov Model-based Speech Emotion Recognition", 2003 IEEE International Conference on Acoustics, Speech, and Signal Processing (ICASSP), 2003, pp. II:1-II:4.

Trigeorgis et al., "Adieu Features? End-to-end Speech Emotion Recognition using a Deep Convolutional Recurrent Network",2016 IEEE International Conference on Acoustics, Speech and Signal Pprocessing (ICASSP), 2016, pp. 5200-5204.

Varma et al., "Inferring generative model structure with static analysis", Advances in neural information processing systems, 2017, pp. 240-250.

(56) References Cited

OTHER PUBLICATIONS

Varma et al., "Snuba: automating weak supervision to label training data", Proceedings of the VLDB Endowment 12, No. 3, 2018, pp. 223-236.
Yang et al., "Hierarchical Attention Networks for Document Classification", Proceedings of North American Chapter of the Association for Computational Linguistics: Human Language Technologies, Jun. 2016, pp. 1480-1489.
Zhang et al., "Character-level Convolutional Networks for Text Classification*" (2015) in 9 pages.
Zhang et al., "Spectral methods meet EM: A provably optimal algorithm for crowdsourcing", Advances in neural information processing systems, 2014, pp. 1260-1268.

* cited by examiner

TRAINING MECHANISM OF VERBAL HARASSMENT DETECTION SYSTEMS

INCORPORATION BY REFERENCE TO ANY PRIORITY APPLICATIONS

This application claims the benefit of priority under 35 U.S.C. § 119(e) of U.S. Provisional Patent Application No. 62/955,895, entitled "TRAINING MECHANISM OF VERBAL HARASSMENT DETECTION SYSTEMS" and filed on Dec. 31, 2019, the disclosure of which is hereby incorporated by reference herein in its entirety. Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like.

In some instances, a user of ride-sharing services may be mistreated by another user, such as a fellow rider or a driver. For example, a user may be verbally harassed, improperly propositioned, threatened, robbed, or treated in other illegal or undesirable ways. Reports submitted by victims or other users of improper behavior by drivers or fellow passengers can help identify users that behaved illegally or inappropriately, enabling disciplinary action to be performed. However, in some circumstances, awaiting a report to be submitted by a victim is insufficient. For example, in some cases, the delay in receiving the report may prevent or reduce the effectiveness of countermeasures that may be performed. Further, in some cases, a victim may not report an occurrence of harassment or other inappropriate or illegal behaviors.

SUMMARY

One aspect of the disclosure provides a computer-implemented method as generally shown and described herein and equivalents thereof.

Another aspect of the disclosure provides a system as generally shown and described herein and equivalents thereof.

Another aspect of the disclosure provides a non-transitory computer readable medium storing instructions, which when executed by at least one computing device, perform a method as generally shown and described herein and equivalents thereof.

Another aspect of the disclosure provides a computer-implemented method of training a machine learning model for detection of verbal harassment. The computer-implemented method comprises: by one or more hardware processors: determining a plurality of verbal harassment heuristics using a first plurality of segments, the segments of the first plurality of segments previously labeled with an occurrence of verbal harassment or a non-occurrence of verbal harassment; determining a plurality of labels for a second plurality of segments by applying the plurality of verbal harassment heuristics and a plurality of verbal harassment patterns, the segments of the second plurality of segments not previously labeled with the occurrence or the non-occurrence of verbal harassment; aggregating the plurality of labels into a plurality of likelihoods for the occurrence of verbal harassment; selecting a subset of segments from the second plurality of segments based on comparing the plurality of likelihoods to at least one threshold; pre-training a machine learning model for verbal harassment detection using the subset of segments from the second plurality of segments and a plurality of randomly selected segments; and subsequent to the pre-training, updating one or more parameters of the machine learning model using a third plurality of segments.

The computer-implemented method of the preceding paragraph can include any sub-combination of the following features: where the third plurality of segments comprises at least some segments previously labeled with the occurrence or the non-occurrence of verbal harassment; where the third plurality of segments comprises a number of segments that is larger than a number of segments in at least one of the second plurality of segments or the plurality of randomly selected segments; where at least one of the first plurality of segments, the second plurality of segments, third plurality of segments, or the plurality of randomly selected segments comprise text data; where text data has been obtained by applying automatic speech recognition to audio data; where a number of segments in the second plurality of segments is larger than a number of segments in the first plurality of segments; where determining the plurality of labels for the second plurality of segments comprises determining more than one label for at least one segment of the second plurality of segments; where aggregating the plurality of labels comprises selecting a single label for the at least one segment of the second plurality of segments; where the plurality of randomly selected segments comprise training data indicative of the non-occurrence of verbal harassment; where the subset of segments from the second plurality of segments comprises training data indicative of the occurrence of verbal harassment; where the at least one threshold is equal to or greater than 0.9; where the segments of the first plurality of segments comprise manually-generated labels; where the subset of segments from the second plurality of segments represents training data indicative of the occurrence of verbal harassment and the plurality of randomly selected segments represents training data indicative of the non-occurrence of verbal harassment; where the machine learning model for verbal harassment detection comprises a text classification machine learning model; and where the text classification machine learning model comprises at least one of hierarchical attention model, a fastText model, or a convolutional neural network model.

Another aspect of the disclosure provides a computer-implemented method of training a machine learning model for detection of verbal harassment. The computer-implemented method comprises: by one or more hardware processors: generating a first set of training data comprising a first plurality of segments by labeling at least some of the segments of the first plurality of segments; pre-training a machine learning model for verbal harassment detection using the first set of training data; and subsequent to completion of pre-training the machine learning model using the first set of training data, updating one or more parameters of the machine learning model using a second set of training data comprising a second plurality of segments.

The computer-implemented method of the preceding paragraph can include any sub-combination of the following features: where labeling at least some of the segments of the first plurality of segments comprises labeling the segments of the first plurality of segments as comprising an occurrence or a non-occurrence of verbal harassment; where labeling at least some of the segments of the first plurality of segments incorrectly labels at least one segment of the first plurality of segments; where the second set of training data comprises at least some segments previously labeled with an occurrence or a non-occurrence of verbal harassment; and where pre-training a machine learning model for verbal harassment detection comprises further using a plurality of randomly selected segments.

Another aspect of the disclosure provides a non-transitory computer readable medium storing instructions, which when executed by at least one processor, cause the at least one processor to perform a method of any sub-combination of the features described in the preceding paragraphs.

Another aspect of the disclosure provides a system for training a machine learning model for detection of verbal harassment, the system comprising one or more processors configured to perform a method of any sub-combination of the features described in the preceding paragraphs.

DETAILED DESCRIPTION

Figure 1A:
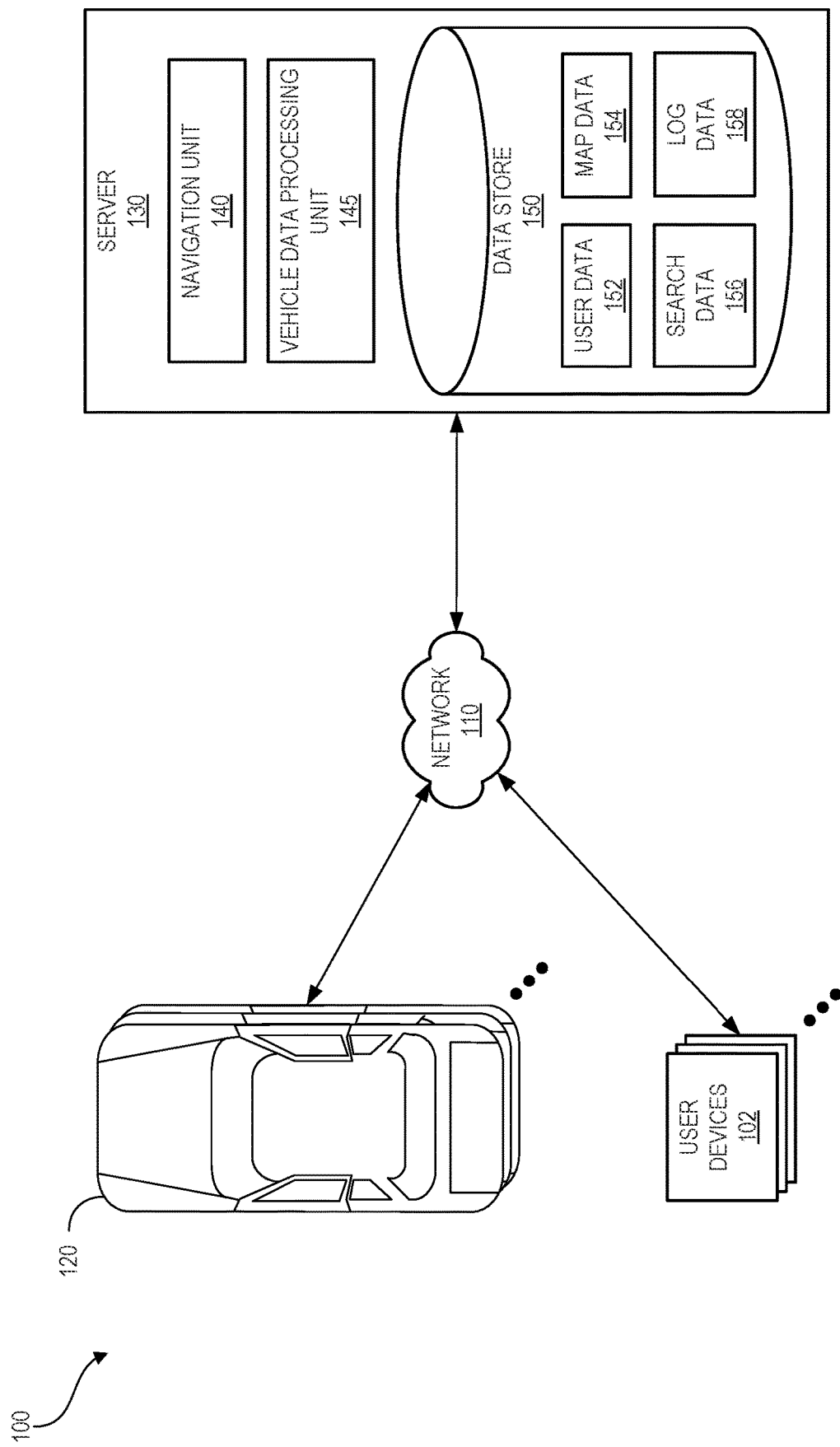
FIG. 1A illustrates a block diagram of a networked vehicle environment in which one or more vehicles and/or one or more user devices interact with a server via a network, according to certain aspects of the present disclosure.

It may be advantageous to use one or more machine learning systems or methods (also referred to as machine learning models) for safety incident detection (such as, verbal harassment detection, asking for contact information, impairment, inebriation, assault, robbery, or the like), for example, in a ride-share setting. In-vehicle audio can be recorded during a trip, for instance, by one or more user devices (e.g., a passenger device, a driver device, etc.). The recorded audio can be processed by one or more machine learning systems in order to determine occurrence of safety incident and to take one or more remedial actions.

One of challenges with using machine learning models is obtaining a sufficient amount of high-quality training data. In some cases, weak supervision techniques can be utilized so that noisy training data can be used for training a machine learning model. Such training data can be labeled through the use of imperfect techniques, such as pattern matching, user-defined heuristics, or the like. Developing and executing even such imperfect techniques can be time consuming and expensive. For instance, one or more domain experts may need to spend a significant amount of time to design pattern matching, heuristics, or the like. For safety incident detection applications (such as, for detection of verbal harassment), the incidents happen with very small probabilities. As a result, the training data can be highly imbalanced, which can aggravate the problem of obtaining true positive samples and the difficulty of designing patterns, heuristics, or the like.

In some cases, one or more heuristics can be automatically generated using a small dataset of segments previously labeled by one or more users (such as, by one or more domain experts). The generated one or more heuristics along with one or more patterns can be used to assign training labels to a large unlabeled dataset of segments. A subset of segments representing occurrence of safety incident (such as, occurrence of verbal harassment) can be selected using the assigned training labels. Randomly selected segments from the large dataset (or another dataset) can be used as being indicative of non-occurrence of safety incident (such as, non-occurrence of verbal harassment). The selected subset of segments and randomly selected segments can be used to train one or more machine learning models for safety incident detection (such as, verbal harassment detection). Advantageously, the training data can be obtained faster and be of higher quality as compared to training data obtained with existing techniques. In some cases, such quality can be measured by training a machine learning system or model with the obtained training data and assessing the performance of the model using test data, which has been labeled prior to classification by the model. Performance of the model can be measured by the area under the receiver operating characteristic curve (sometimes referred to as AUCROC or AUC). Advantageously, using the approaches described herein can lead to improvements in the AUC of at least about 3 or more points.

Another one of the challenges with using machine learning models is correctly training a model to attain sufficient accuracy, speed, or the like. For example, effectively training the model can be a significant challenge even when high quality training data is available. These problems can be exacerbated when high quality training data is not available. For example, training mechanism can be challenging when lower quality training data having one or more segments that have been labeled incorrectly (sometimes referred to as noisy labeled data or noisy labeled training data) is used, particularly when such training data is large.

In some cases, large scale (such as, thousand or more samples), lower quality training data can be automatically generated using any of the approaches for automatic labeling described herein. Such training data can be used to pre-train a model (for instance, a model for detection of verbal harassment). Parameters of the pre-trained model can be fine-tuned, refined, or updated using another one or more higher-quality sets of training data, with which the model can be subsequently trained and/or evaluated. Advantageously, classification accuracy can be improved, training time can be reduced, or the like.

Detailed descriptions and examples of systems and methods according to one or more illustrative embodiments of the present disclosure may be found, at least, in the sections entitled Generation of Training Data and Training a Machine Learning Model, as well as in the section entitled Example Embodiments, and also in FIGS. 2, 3, 4, 5A to 5C, and 6 herein. Furthermore, components and functionality safety incident detection (such as, verbal harassment detection) may be configured and/or incorporated into the networked vehicle environment 100 described herein in FIGS. 1A-1B.

Various embodiments described herein are intimately tied to, enabled by, and would not exist except for, vehicle and/or computer technology. For example, safety incident detection (such as, verbal harassment detection) described herein in reference to various embodiments cannot reasonably be performed by humans alone, without the vehicle and/or computer technology upon which they are implemented.

Networked Vehicle Environment

FIG. 1A illustrates a block diagram of a networked vehicle environment 100 in which one or more vehicles 120 and/or one or more user devices 102 interact with a server 130 via a network 110, according to certain aspects of the present disclosure. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. A user device 102 can execute an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. The server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. The network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
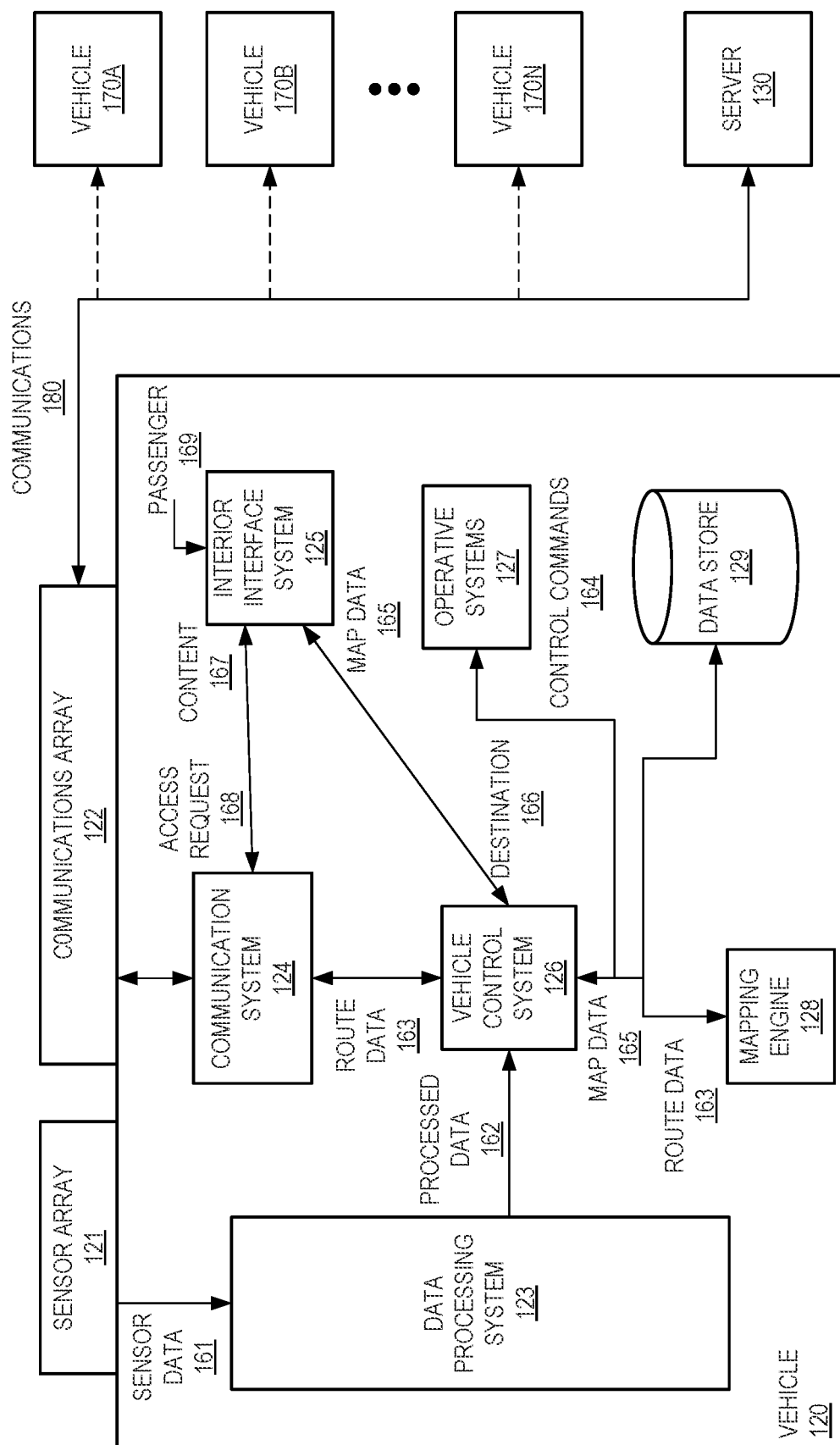
FIG. 1B illustrates a block diagram showing the vehicle of FIG. 1A in communication with one or more other vehicles and/or the server of FIG. 1A, according to certain aspects of the present disclosure.

FIG. 1B illustrates a block diagram showing the vehicle 120 of FIG. 1A in communication with one or more other vehicles 170A-N and/or the server 130 of FIG. 1A, according to certain aspects of the present disclosure. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. The vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). The vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Generation of Training Data

Figure 2:
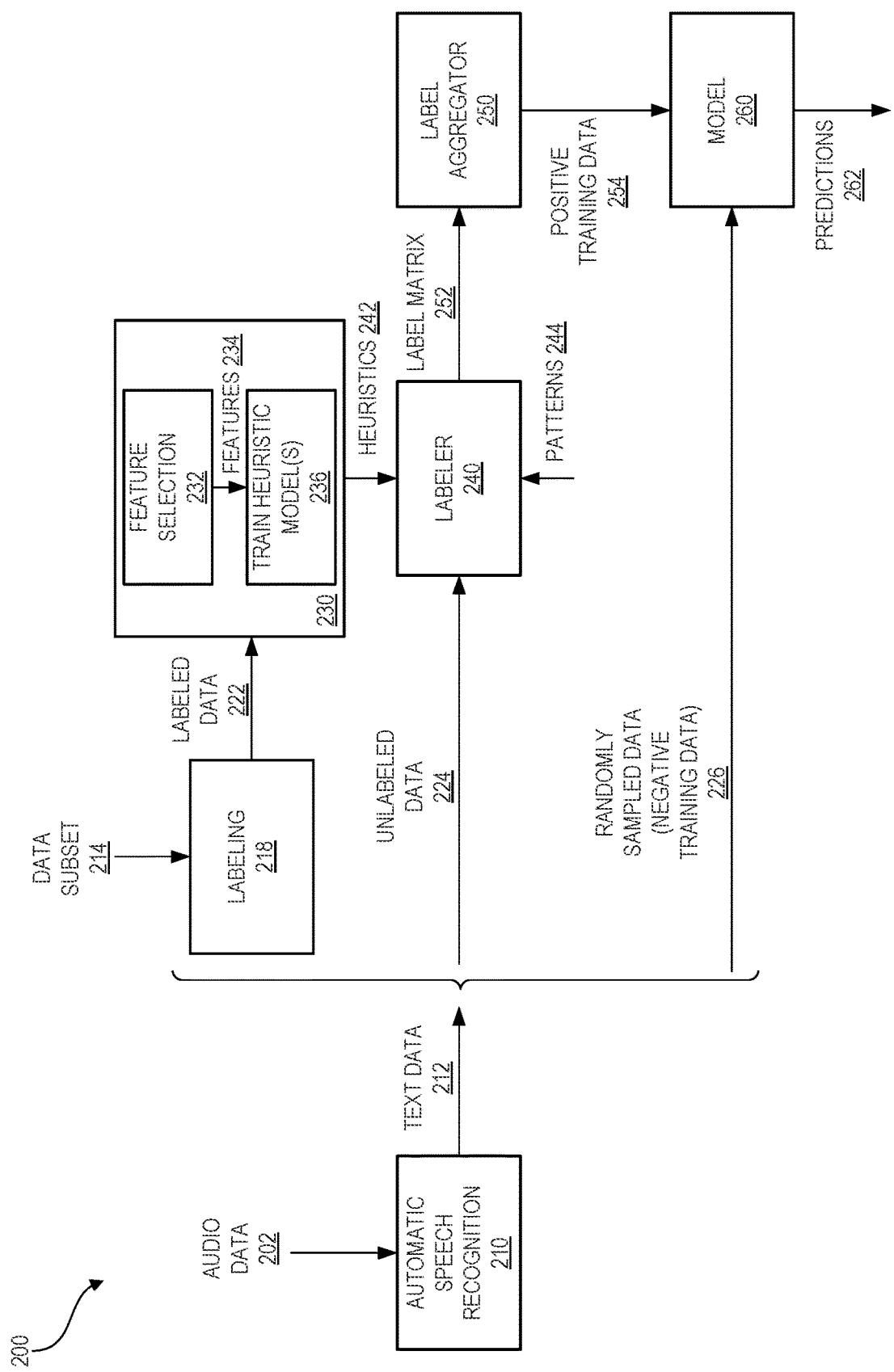
FIG. 2 illustrates a block diagram of a system for generation of training data, according to certain aspects of the present disclosure.

FIG. 2 illustrates a block diagram of a system 200 for generating training data that can be used for verbal harassment detection. The training data can be used to train one or more machine learning systems or models for verbal harassment detection. The illustrated system 200 can be implemented by one or more computing devices, such as by one or more of the user devices 102, server 130, or the like.

With reference to FIG. 2, audio data 202 can be in-vehicle audio data, which can be recorded during a trip by one or more user devices (for example, passenger and/or driver user devices 102). For example, a user device 102 may have, may host, and/or may execute a ride-sharing application. The ride-sharing application may include any application that enables a user to request a ride from an autonomous vehicle, a semi-autonomous vehicle (e.g., vehicles that provide driver-assist functionality), and/or another user that is participating in a ride-sharing service as a driver and/or that has a user device 102 with the ride-sharing application. The user device 102 may include an audio capture service. The audio capture service may be part of the ride-sharing application or may be separate, but accessible by the ride-sharing application. The audio capture service may include any service or application hosted and/or executed by the user device 102 that is capable of capturing speech or other utterances using one or more microphones of the user device 102. In some cases, the utterances may be captured by microphones within the vehicle 120 with which the user device 102 is capable of interfacing.

Audio data 202 can include speech data, which may be processed to remove noise (such as, music, navigation guidance, environmental noise, or the like). Audio data 202 can be broken up into one or more audio segments of fixed or varying duration of time (such as, about 1 minute or less or more, about 5 minutes or less or more, about 10 minutes or less or more, or the like). Audio data 202 can be converted from audio format into text data 212 by an automatic speech recognition (ASR) system 210. In some cases, the ASR system 210 may include one or more of hidden Markov models, deep learning models, or the like to convert the speech included in one or more audio segments to text data 212. Text data 212 can include one or more text segments corresponding to the one or more audio segments.

A subset 214 of text data 212 can be selected and provided to a labeling block 218 for labeling. The selected data subset 214 can be small subset of segments, for example, when compared to a set of unlabeled data 224. For instance, the selected subset 214 can include several hundred (or less or more) text segments. In some cases, the selected subset 214 can include text segments identified by riders (and/or drivers) as containing one or more occurrences of verbal harassment. In block 218, the selected subset 214 can be labeled by a domain expert or the like. In block 218, one or more labels can be selected and assigned. For example, a domain expert can label a text segment with the occurrence of a particular type of verbal harassment, such as sexual harassment, aggressive behavior, extortion, or the like, or non-occurrence of verbal harassment. To accelerate the labeling in block 218, the subset 214 can be selected to include text segments that riders (and/or drivers) have identified as having one or more occurrences of verbal harassment.

Labeled data 222 can be used by a system 230 to generate or determine one or more heuristics 242, which can include one or more heuristics for labeling text data 212. Data 222 can be manually labeled, for example, by a domain expert. Data 222 can include a smaller dataset than, for example, unlabeled data 224. The system 230 can determine the one or more heuristics 242 using labeled data 222. A heuristic can be configured to analyze content of a conversation in order to identify occurrence or non-occurrence of verbal harassment. In some cases, heuristics can be one or more of decision trees, logic regression, nearest neighbor, or the like. The system 230 can utilize a labeling generation system, such as for example one or more features of the labeling system described in Varma et al., "Snuba: Automating Weak Supervision to Label Training Data," *Proceedings of the VLDB Endowment*, Vol. 12, No. 3, November 2018 ("Snuba"), which is hereby incorporated by reference herein in its entirety. The system 230 can generate the one or more heuristics 242 for automatically labeling data. The system 230 can include a feature selector 232 that processes the labeled data 222 and extracts one or more primitives or features 234 (for example, keywords, phrases, or the like). For example, the feature selector 232 can utilize term frequency-inverse document frequency (tf-idf) metric to identify and/or rank the one or more features. The system 230 can train one or more models 236 (such as, machine learning models) with the one or more features 234 in order to determine the one or more heuristics 242. One or more models 236 can include at least one of decision trees, logistic regression, nearest neighbor, or the like. The one or more models 236 can be trained iteratively. The one or more models 236 can be biased and/or noisy, which can reduce the time for training of the one or more models 236.

Labeler 240 can label unlabeled data 224, for example, by applying one or more heuristics 242. Labeler 240 can automatically and efficiently label unlabeled data. Unlike labeled data 222, unlabeled data 224 may not have been previously labeled. Unlabeled data 224 can be a larger set of data than the subset 214. For instance, unlabeled data 224 can include a number of text segments that is about five (or less or more) times larger than the number of text segments in labeled data 222. Unlabeled data 224 can be automatically labeled by the labeler 240 using the determined one or more heuristics 242. The labeler 240 can use one or more patterns 244 in addition to the one or more heuristics 242 in order to improve accuracy and/or speed of the system 200. A pattern can define matching of words, phrases, or the like and may be designed by a domain expert. The labeler 240 can apply the one or more heuristics 242 and the one or more patterns 244 to determine labels for the unlabeled data 224.

The labeler 240 can generate or output a label matrix 252. A text segment of unlabeled data 224 (such as, text corresponding to a five-minute segment of audio data) can be labeled by more than one heuristic and/or pattern. Unlabeled data 224 can include multiple text segments. As a result, the labeler 240 can output the label matrix 252 for unlabeled data 224. A label aggregator 250 can accept the label matrix 252 as input and determine a particular label (or labels) for each of the segments of unlabeled data 224. The label aggregator 250 can additionally determine the probability or likelihood associated with the particular label (or determine likelihoods associated with a plurality of labels). In some cases, the label aggregator can determine the probability or likelihood of occurrence of verbal harassment for each of the segments of unlabeled data 224. In some cases, the label aggregator 250 can utilize one or more features of the Snorkel architecture described in Ratner et al., "Snorkel: Rapid Training Data Creation with Weak Supervision," *Proceedings of the VLDB Endowment*, Vol. 11, No. 3, 2017 ("Snorkel"), which is hereby incorporated by reference herein in its entirety.

The label aggregator 250 can select for output a subset of data from the unlabeled data 224. Such subset of data can be selected as data that is likely to include or be indicative of occurrences of verbal harassment (sometimes referred to as positive data or positive training data). The label aggregator 250 can determine positive training data 254 based on comparing the determined probability or likelihood (or probabilities) to a threshold (or thresholds). The threshold can be selected from a range between zero and one, with zero representing lowest probability and one representing certainty. For example, the threshold can be about 0.5 or more, about 0.6 or less or more, about 0.7 or less or more, about 0.8 or less or more, about 0.9 or less or more, or the like. The label aggregator 250 can select one or more text segments having the determined probability or likelihood that satisfies the threshold (for example, meets and/or exceeds the threshold). As illustrated in FIG. 2, positive training data 254 can be used by the system 200 for training one or more machine learning models 260 for verbal harassment detection.

Text segments with determined probabilities that do not satisfy the threshold, which can be referred to as marginal data, may be used by the system 200 as data that is likely to include or be indicative of non-occurrences of verbal harassment. Such text segments can be referred to as negative data or negative training data. Negative training data may be selected by comparing the determined probability or likelihood to another threshold, which can be indicative of a lower likelihood or probability than the threshold used for identifying positive training data. For example, another threshold can be less than about 0.5, about 0.4 or less or more, about 0.3 or less or more, about 0.2 or less or more, about 0.1 or less or more, or the like. Negative training data can be used by the system 200 for training the one or more machine learning models 260. Using negative training data for training a machine learning model can improve performance of the model, such as improve specificity (or detection of negative samples) of the model.

In some cases, instead of using marginal data determined by the label aggregator 250 as negative training data, accuracy and/or speed of the system 200 may be improved by randomly sampling the audio data 202 and/or text data 212 in order to obtain negative training data 226. Because occurrences of verbal harassment are rare (such as, several occurrences among hundreds of thousands of ride-sharing trips), randomly selecting a subset of data from a large set of audio and/or text data representing ride-sharing trips (for example, from all trips on a given day, which may be about 500 million of trips or less or more) as negative training data can lead to improvements in verbal harassment detection.

Positive training data 254 and negative training data 226 can be used to train to one or more models 260. The one or more models 260 can be text classification models. For example, the one or more models 260 can include a hierarchical attention model (HAN), a fastText model, or a convolutional neural network model, or the like. The one or more models 260 can output predictions 262, such as likelihood or probability of occurrence of verbal harassment in one or more text segments being analyzed. The one or more models 260 can be a classifier for the detection of occurrence (and/or non-occurrence) of verbal harassment.

Advantageously, positive training data 254 and negative training data 226 can be determined quickly. Even though positive training data 254 and/or negative training data 226 can include one or more incorrectly labeled segments (or represent noisy labeled training data), using such training data for training the one or more models 260 can improve classification accuracy, speed, or the like as described herein.

Experiments have been conducted to assess performance of the disclosed approaches for generating training data for verbal harassment detection, such as of the system 200. For example, the following data sets have been used for the experiments.

1) Subset of labeled data (such as, labeled data 222): 2370 segments (886 positive; 1484 negative).

2) Unlabeled data (such as, unlabeled data 224): 9476 segments (3596 positive; 5880 negative).

3) Test data for evaluation of a model: 12,092 segments (3614 positive; 8478 negative). This data can be used for evaluating the performance of a trained model.

In one or more experiments, unlabeled data and test data have been manually labeled in order to assess the performance. In use, these data sets would not be manually labeled, and would be automatically labeled, for example, by the system 200. In the one or more experiments, test data (for example, 12,092 segments) was provided to a machine learning model (such as, one or more models 260). For instance, HAN model has been used. Performance of the model was evaluated based on the comparison of the output of the model with labels manually assigned to the test data.

Table 1 shows experimental results illustrating the improvement in the labeling quality achieved by the disclosed approaches, such as by the system 200. As shown in cell 1A, 66 patterns have been designed, for example, by verbal harassment experts. As shown in cell 1 B, the label quality assigned to unlabeled data (such as, unlabeled data 224) with use of patterns only can be relatively low. For example, AUC of 0.506 can be attained (with AUC varying between 1 and 0.5, where 0.5 is typically considered as a baseline random prediction). In some cases, such poor performance may be obtained by using Snuba. Row 2 illustrates the improvement from the use of heuristics. A subset of labeled data (such as, the subset 222) can be used to generate heuristics (such as, one or more heuristics 242). In the conducted experiment, 25 heuristics (such as, decision trees) were generated. As illustrated in cell 2B, label quality assigned to unlabeled data with use of heuristics only has improved to AUC of 0.670 (as compared to AUC=0.506). Row 3 illustrates that additional improvement that can be achieved from using both model heuristics (such as, the one or more heuristics 242) and patterns (such as, one or more patterns 244). Such approach is, for example, illustrated in FIG. 2 (such as, the labeler 240). As shown in cell 2C, label quality assigned to unlabeled data can be further improved (to AUC of 0.674).

TABLE 1

| | A<br>Label Generation<br>Heuristics | B<br>Label Quality Assigned<br>to Unlabeled Data |
|---|---|---|
| 1 | Patterns only<br>(such as, 66 patterns) | Coverage = 0.023,<br>Accuracy = 0.466 Recall = 0.02,<br>Precision = 1.0 AUC = 0.506 |
| 2 | Model heuristics only (such as,<br>use of labeled data to generate<br>25 model heuristics) | Coverage = 0.831,<br>Accuracy = 0.695 Recall = 0.222,<br>Precision = 0.693 AUC = 0.670 |
| 3 | Model heuristics and patterns<br>(such as, 66 patterns and 25<br>model heuristics; 91 total) | Coverage = 0.848,<br>Accuracy = 0.678 Recall = 0.262,<br>Precision = 0.704 AUC = 0.674 |

Table 2 shows experimental results illustrating the improvement in the labeling quality achieved by the disclosed approaches, such as by the system 200. Table 2 provides comparisons of the performance of a machine learning model (such as, HAN model) trained with various different types of training data. Performance of the model may be evaluated based on the comparison of the output of the model with labels manually assigned to test data.

As shown in cell 2B, the model trained with positive and negative training data labeled automatically attains AUC of 0.698. Such performance may be considered to be low, particularly in view of better performance achieved when the model is trained solely with a small set of labeled data (such as, labeled data 222), as illustrated in row 1 (AUC=0.735 as compared to AUC=0.698). In some cases, using Snuba to label the training data can result in such low performance (AUC=0.698).

As shown in cell 2C, instead of using marginal data as negative training data, using randomly selected data (such as, randomly selected data 226) as negative training data can increase performance (AUC=0.742 as compared to AUC=0.698). This can result in a 6.3% increase in the performance.

As shown in cell 3B, training the model with both labeled data (such as, labeled data 222) and unlabeled data (such as, unlabeled data 224) can improve (AUC=0.718 as compared to AUC=0.698). Combining both of these approaches (as illustrated in FIG. 2), which results in training the model with 1) randomly selected data (such as, randomly selected data 226) as negative training data and 2) both labeled data (such as, labeled data 222) and unlabeled data (such as, unlabeled data 224), can further improve performance. As shown in cell 3C, AUC of 0.751 can be attained. This results in significant performance improvement over cell 2B (AUC=0.698) as well as in the improvement of 3.3 AUC points over cell 3B.

TABLE 2

| | Datasets | Test Performance with One or More Models | |
|---|---|---|---|
| 1 | Labeled data only | AUC = 0.735 | |
| 2 | Unlabeled data only | AUC = 0.698 (positive and negative training data labeled automatically) | AUC = 0.742 (only positive training data labeled automatically; negative training data randomly selected) |
| 3 | Labeled and unlabeled data | AUC = 0.718 (positive and negative training data labeled automatically) | AUC = 0.751 (only positive training data labeled automatically; negative training data randomly selected) |
| | | A | B | C |

Training a Machine Learning Model

Figure 3:
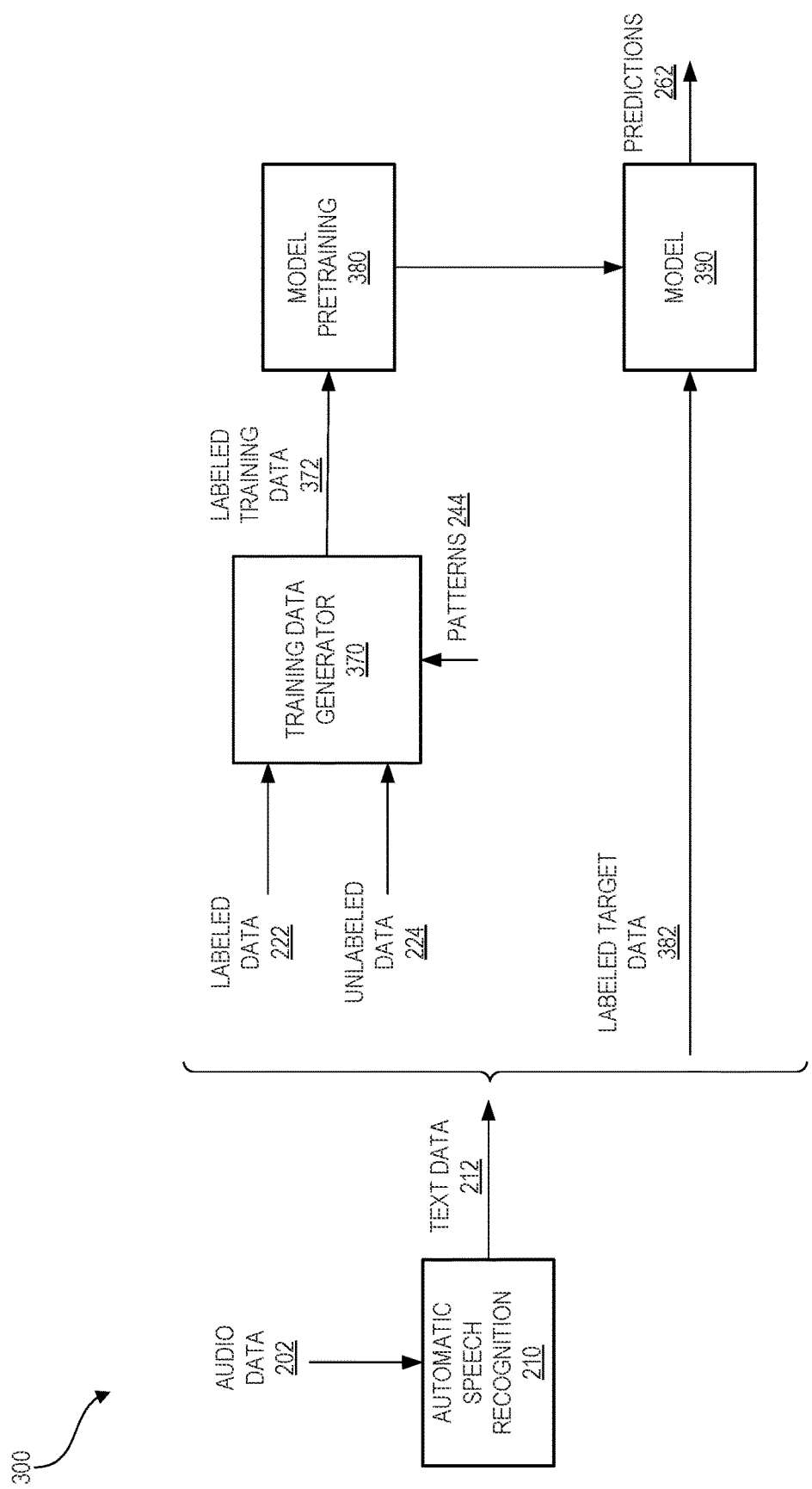
FIG. 3 illustrates a block diagram of a system for training a machine learning model, according to certain aspects of the present disclosure.

FIG. 3 illustrates a block diagram of a system 300 for training a machine learning model. The machine learning model can detect verbal harassment. The illustrated system 300 can be implemented by one or more computing devices, such as by one or more of the user devices 102, server 130, or the like. Certain features of the system 300 can be the same or similar to the one or more features of the system 200.

As described herein in connection with the system 200, text data 212 that includes one or more text segments corresponding to one or more audio segments of audio data 202 can be obtained, for example, by using the ASR system 210. A training data generator 370 can determine labeled training data 372, which can include the positive training data 254 and/or the negative training data 226, based on one or more of labeled data 222, unlabeled data 224, and one or more patterns 244. Training data generator 370 can be include the functionality of one or more of the system 230, the labeler 240, and the label aggregator 250.

As illustrated in block 380, the system 300 can train a machine learning model 390, which can correspond to the one or more models 260, using labeled training data 372. As described herein, the model 390 can be a text classification model. The model 390 can be trained with labeled target data 382 (for example, subsequently to the training with labeled training data 372). Labeled target data 382 can be higher quality training data than labeled training data 372. For instance, labeled training data 372 can include automatically generated labels, as described herein. In some cases, labeled target data 382 may be at least partially labeled, for example, by one or more domain experts so that labels of labeled target data 382 are of higher quality than labels of labeled training data 372. The model 390 can output predictions 262, such as the likelihood or probability of occurrence of verbal harassment in one or more text segments being analyzed.

As described herein, it may be advantageous to initially train the model 390 with labeled training data 372. This training can be sometimes referred to as pre-training. Subsequently, the model 390 can be trained and/or evaluated with labeled target data 382 to fine-tune, refine, or update one or more parameters of the model. In such manner, the one or more model parameters would not need to be learned from scratch. Advantageously, accuracy of the model, training speed, or the like can be improved as compared with training the model with a combination of labeled training data 372 and labeled target training data 382, as explained herein for example in connection with FIGS. 4 and 5A to 5C.

Experiments have been conducted to assess performance of the disclosed approaches for training one or more models, such as of the system 300. For example, the following data sets have been used for the experiments.

1) Subset of labeled data (such as, labeled data 222): 3851 segments (1353 positive; 2498 negative).

2) Unlabeled data (such as, unlabeled data 224): 40,000 segments (for example, randomly selected segments from ride-sharing trips on a certain day).

3) Automatically labeled data (such as, labeled training data 372): 38,112 segments (10,772 positive; 27,340 negative). As described herein, positive training data can be selected by the label aggregator 250 based on the threshold, and negative training data can include randomly sampled data (for example, randomly selected from all the ride-sharing trips on a certain day).

4) Training and/or test data for evaluation of a model (such as, labeled target data 382): 41,800 manually labeled (for example, by domain experts) segments (10,961 positive; 30,839 negative).

5) Test data for evaluation of a model: 12,092 segments (3614 positive; 8478 negative). This data can be used for evaluating the performance of a trained model.

Figure 4:
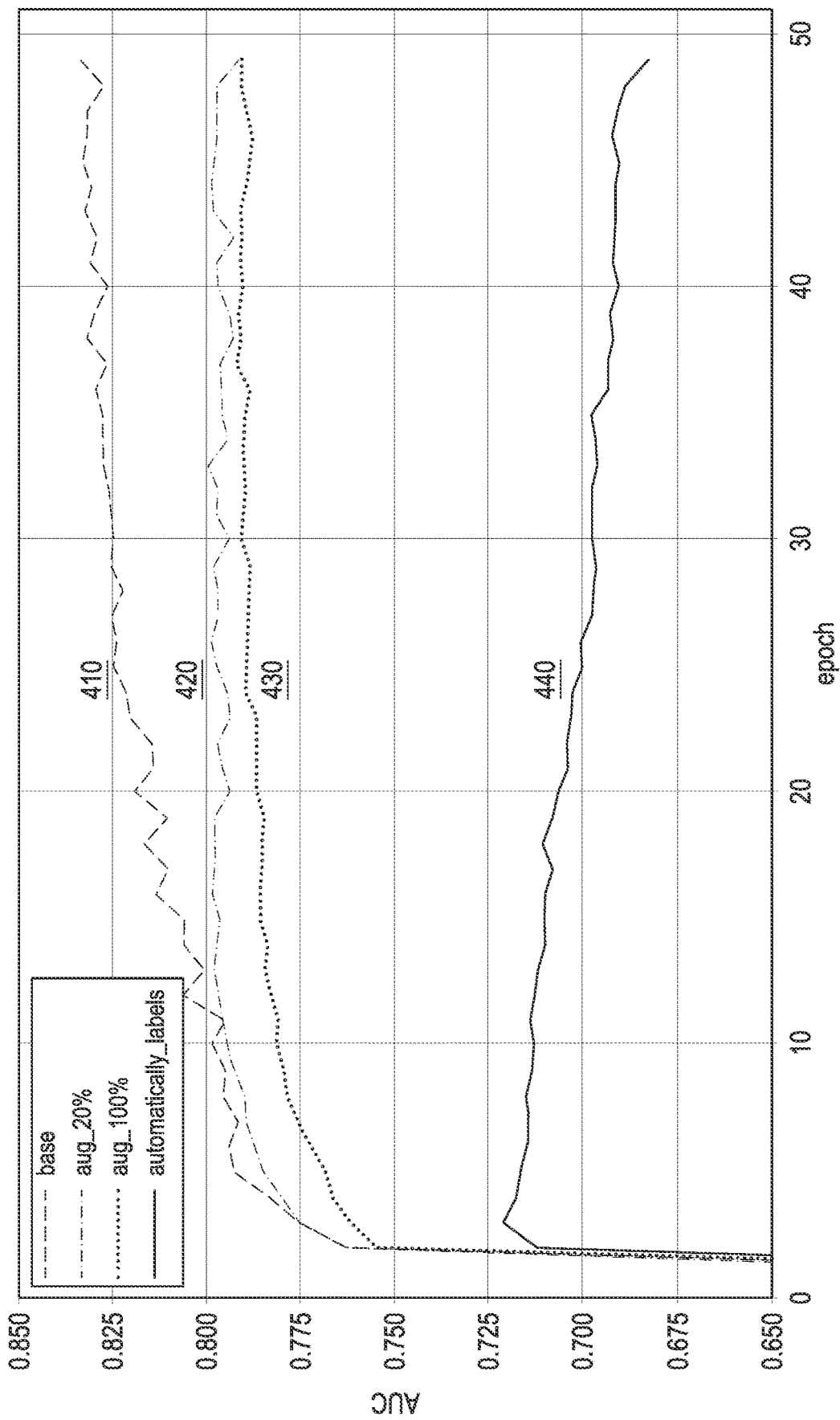
FIGS. 4 and 5A to 5C illustrate comparison of the performance of a machine learning model trained with various types of training data, according to certain aspects of the present disclosure.

FIG. 4 illustrates performance of a model trained with data incorporating different amounts of automatically labeled data. FIG. 4 illustrates AUC plotted on the y-axis versus epochs (such as, cycles through the training data set) plotted on the x-axis. Plot 440 illustrates performance of training with automatically labeled data. The model trained with automatically labeled data can have AUC of about 0.718 (as shown at epoch 3).

FIG. 4 also illustrates performance of the model trained with different amounts of automatically labeled training data incorporated into training data for evaluation of the model. The data shown in FIG. 4 can be obtained using a model that has been trained with one set of training data and without the use of pre-training described herein.

Plot 410 shows performance of training using only training data for evaluation of the model (such as, 41,800 segments) and no automatically labeled training data. As is illustrated, AUC of at least about 0.825 can be attained.

Incorporating automatically labeled data into the training data set can cause decrease in performance. Further decreases can be observed when greater amount of automatically labeled training data is incorporated. For example, plot 420 illustrates performance of the model trained by incorporating 20% of automatically labeled data, which results in a decrease of AUC to about 0.8. Plot 430 illustrates performance of the model trained by incorporating 100% of automatically labeled data, which results in further decrease of AUC to about 0.785.

As illustrated in FIG. 4, incorporating automatically labeled data (which can be noisy labeled data) into the training data can cause decrease in performance. Instead, as described herein in connection with system 300, the model can be pre-trained with automatically labeled data. The model can be subsequently trained with additional training data to refine or update the one or more parameters of the model. Additional training data can be training data for evaluation (such as, labeled target data 382).

Figure 5A:
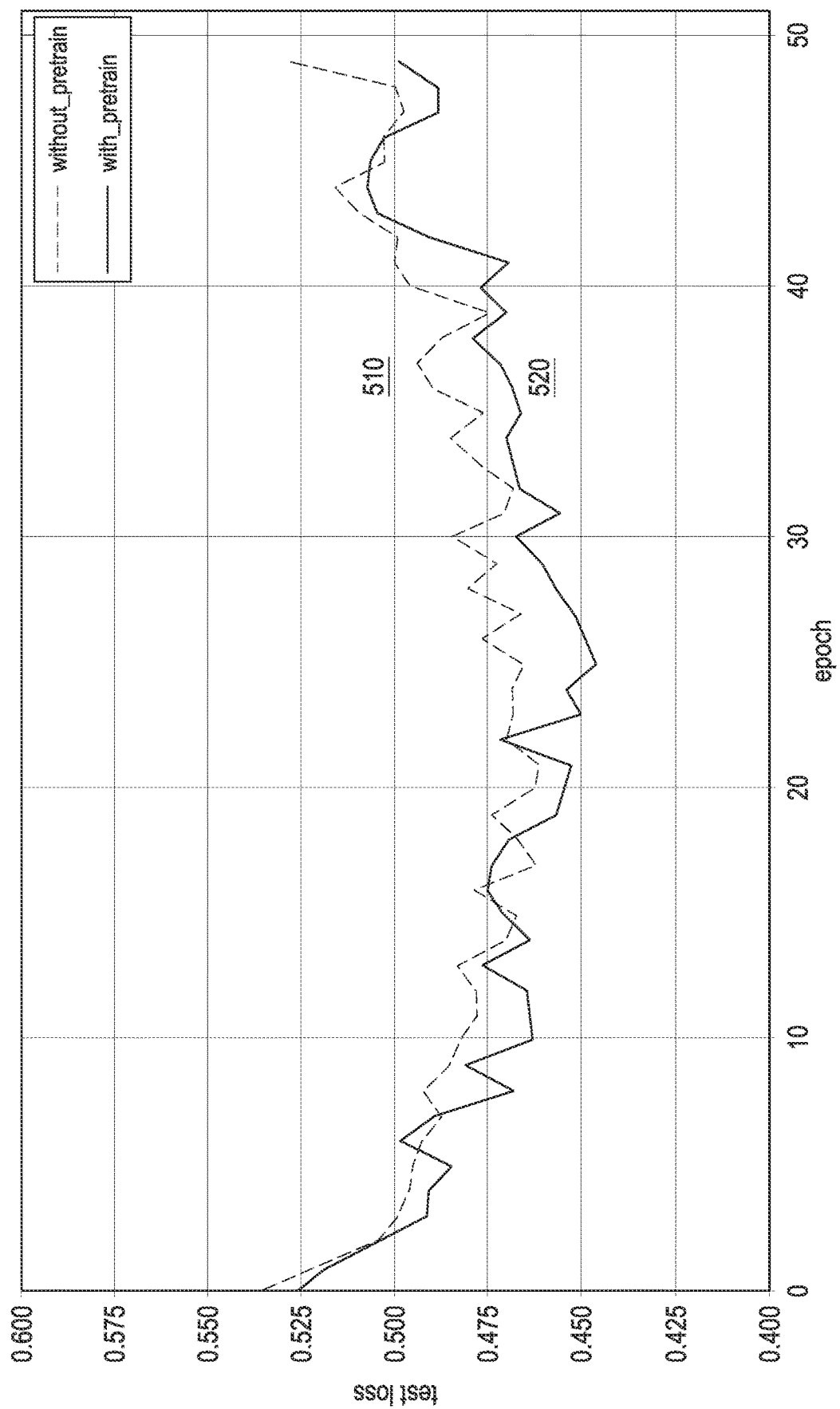
Figure 5B:
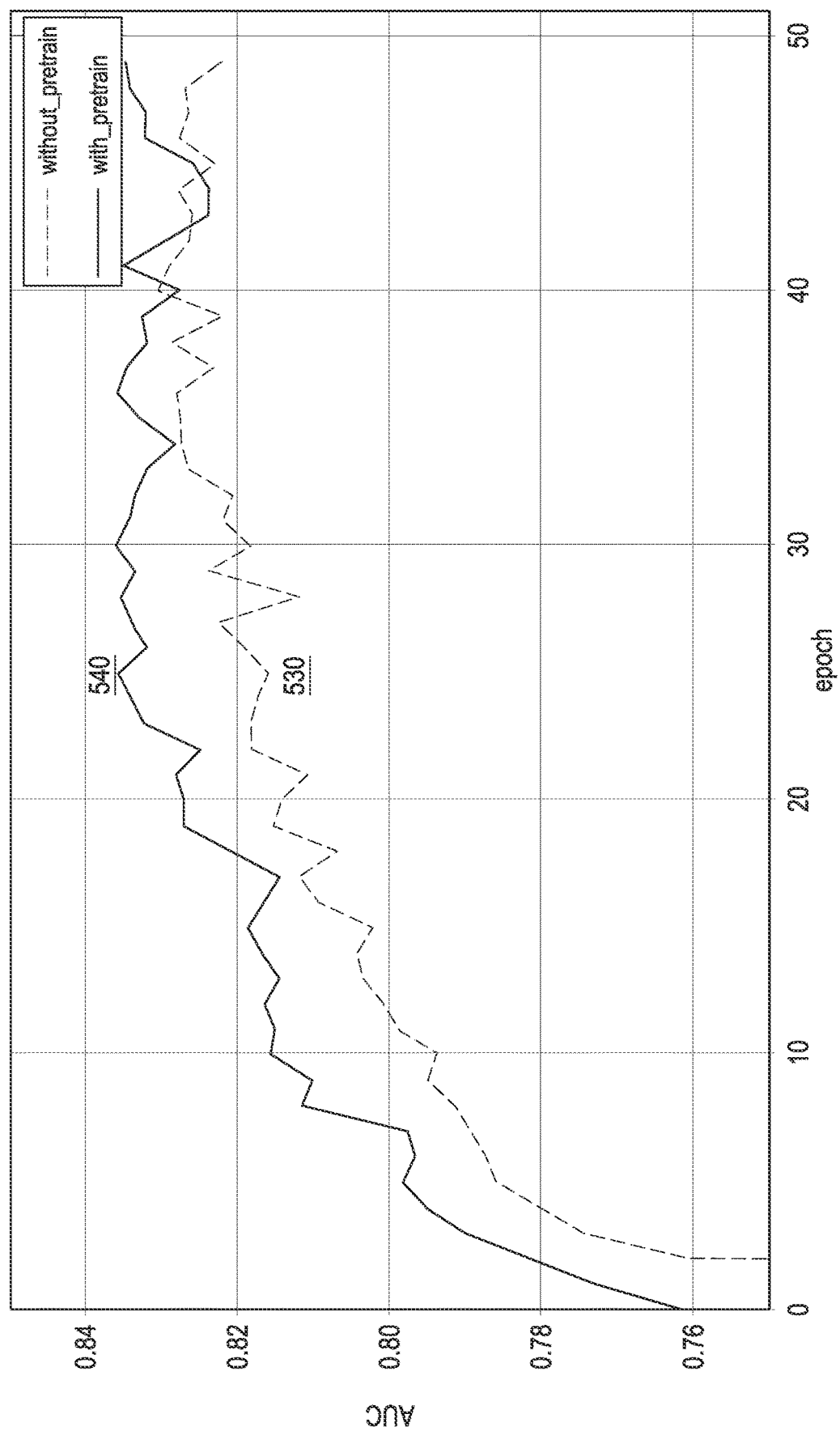
Figure 5C:
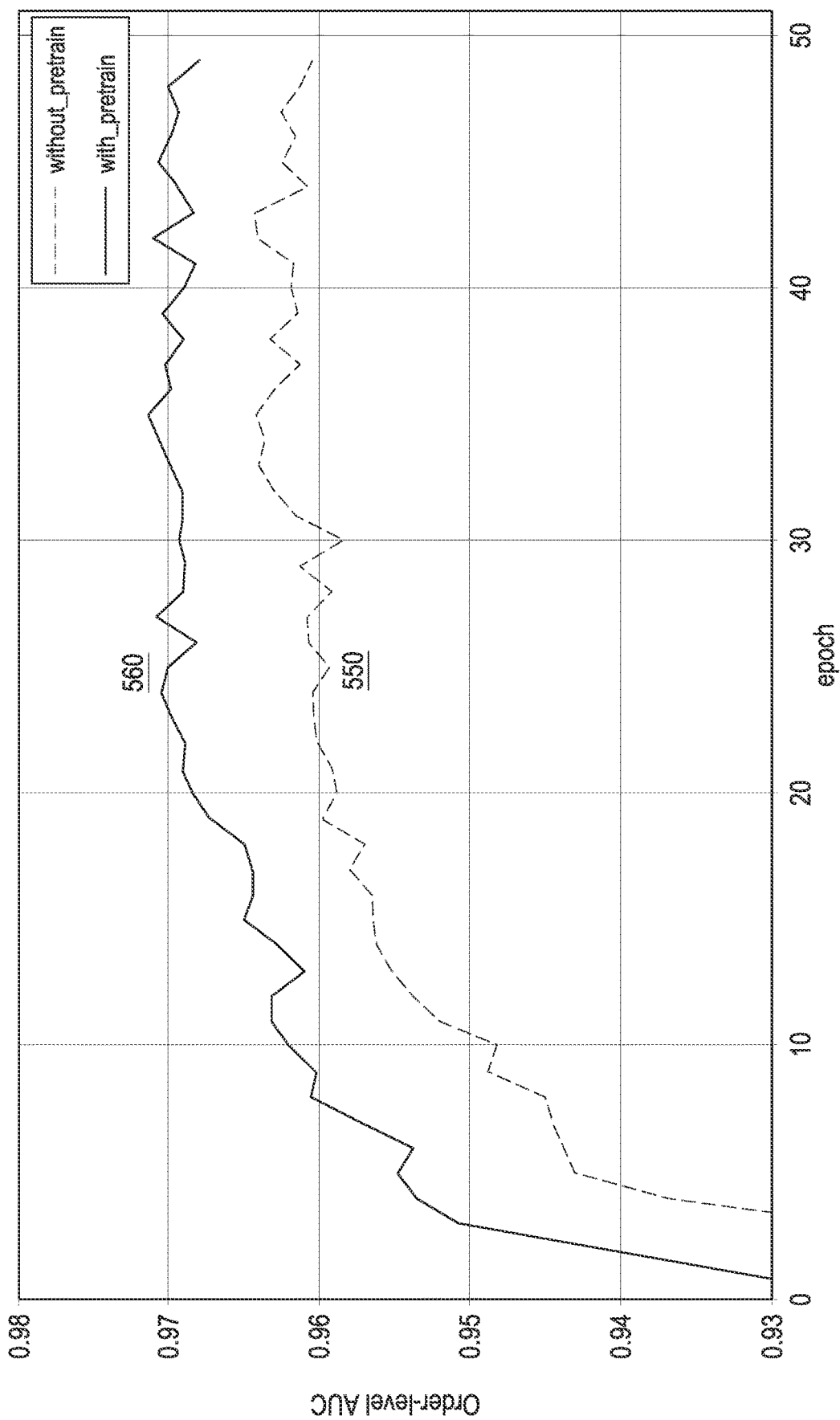

FIGS. 5A to 5C illustrate improvements in the performance of the model resulting from pre-training the model. FIG. 5A illustrates loss plotted on the y-axis versus epochs plotted on the x-axis. Lower loss can indicate better performance. Plot 510 shows loss when the model has not been pre-trained, and plot 520 shows loss when the model has been pre-trained. As is illustrated, pre-trained model can experience lower loss (for example, about 0.45 as compared to about 0.463). As a result, pre-trained model can perform better.

FIG. 5B illustrates segment-level AUC plotted on the y-axis versus epochs plotted on the x-axis. Higher AUC can indicated better performance (for example, better accuracy). Plot 530 shows segment-level AUC when the model has not been pre-trained, and plot 540 shows segment-level AUC when the model has been pre-trained. As is illustrated, pre-trained model has higher segment-level AUC (for example, about 0.833 as compared to about 0.820).

FIG. 5C illustrates ride-sharing trip-level AUC plotted on the y-axis versus epochs plotted on the x-axis. As described herein, a ride-sharing trip can include a plurality of segments of audio data and/or corresponding text data. Plot 550 shows ride-sharing trip-level AUC when the model has not been pre-trained, and plot 560 shows ride-sharing trip-level AUC when the model has been pre-trained. As is illustrated, pre-trained model has higher segment-level AUC (for example, about 0.97 as compared to about 0.96).

Figure 6:
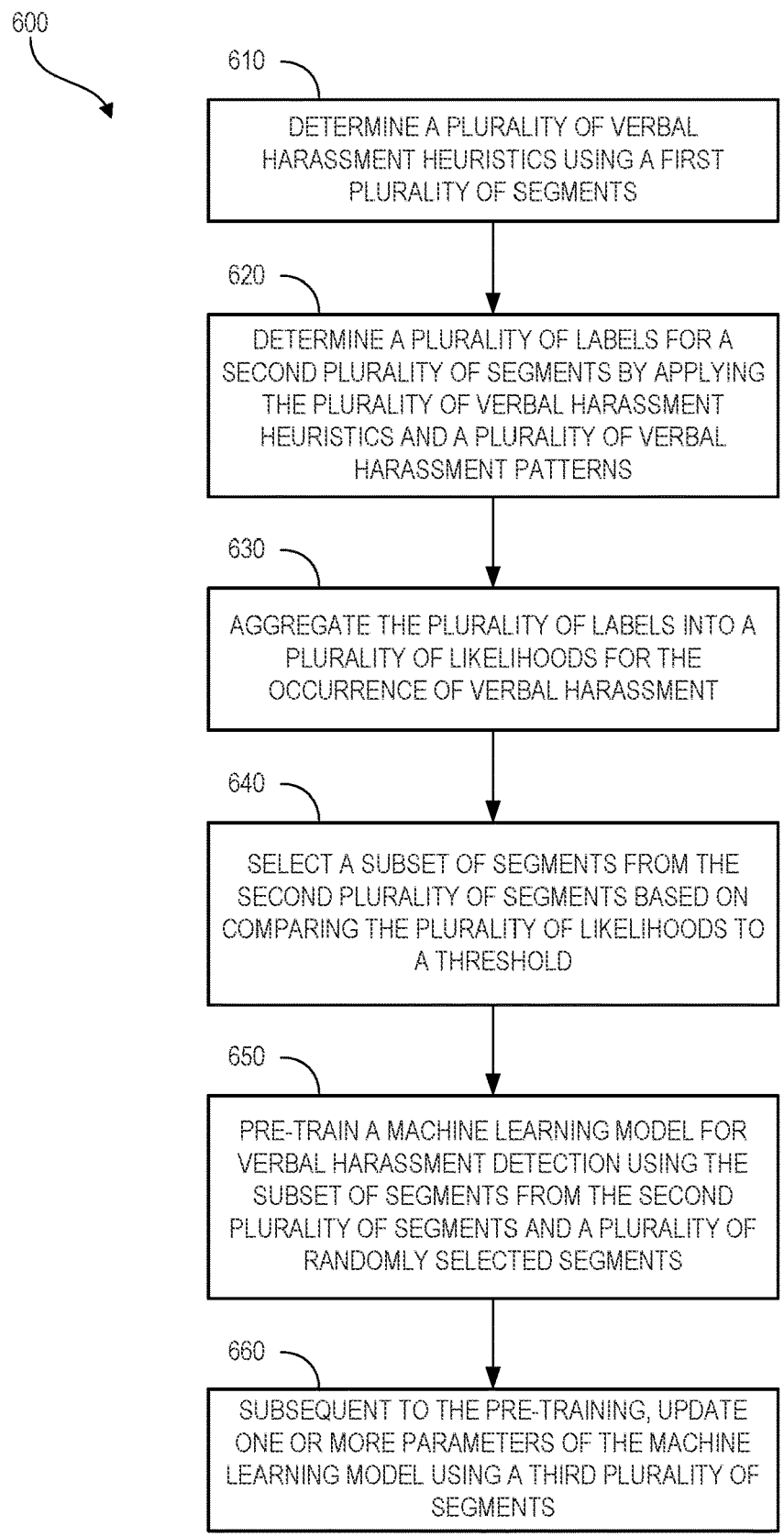
FIG. 6 illustrates a block diagram of a process for generation of training data, according to certain aspects of the present disclosure.

FIG. 6 illustrates a block diagram of a process 600 for generating training data. The process 600 can be implemented by one or more computing devices, such as by one or more of the user devices 102, server 130, or the like. In block 610, the process 600 can determine a plurality of verbal harassment heuristics using a first plurality of segments. The segments of the first plurality of segments may have been previously labeled with an occurrence of verbal harassment or a non-occurrence of verbal harassment. In block 620, the process 600 can determine a plurality of labels for a second plurality of segments by applying the plurality of verbal harassment heuristics and a plurality of verbal harassment patterns. The segments of the second plurality of segments may not have been previously labeled with the occurrence or the non-occurrence of verbal harassment. In block 630, the process 600 can aggregate the plurality of labels into a plurality of likelihoods for the occurrence of verbal harassment. In block 640, the process 600 can select a subset of segments from the second plurality of segments based on comparing the plurality of likelihoods to a threshold. In block 650, the process 600 can pre-train a machine learning model for verbal harassment detection using the subset of segments from the second plurality of segments and a plurality of randomly selected segments. In block 660, the process 600 can, subsequent to the pre-training, update one or more parameters of the machine learning model using a third plurality of segments.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation. For example, detection of any safety incident can be performed using any of the approaches for the generation of training data for verbal harassment detection described herein.

Example Embodiments

Some example enumerated embodiments are recited in this section in the form of methods, systems, and non-transitory computer-readable media, without limitation.

One aspect of the disclosure provides a computer-implemented method as generally shown and described herein and equivalents thereof.

Another aspect of the disclosure provides a system as generally shown and described herein and equivalents thereof.

Another aspect of the disclosure provides a non-transitory computer readable medium storing instructions, which when executed by at least one computing device, perform a method as generally shown and described herein and equivalents thereof.

Another aspect of the disclosure provides a computer-implemented method of training a machine learning model for detection of verbal harassment. The computer-implemented method comprises: by one or more hardware processors: determining a plurality of verbal harassment heuristics using a first plurality of segments, the segments of the first plurality of segments previously labeled with an occurrence of verbal harassment or a non-occurrence of verbal harassment; determining a plurality of labels for a second plurality of segments by applying the plurality of verbal harassment heuristics and a plurality of verbal harassment patterns, the segments of the second plurality of segments not previously labeled with the occurrence or the non-occurrence of verbal harassment; aggregating the plurality of labels into a plurality of likelihoods for the occurrence of verbal harassment; selecting a subset of segments from the second plurality of segments based on comparing the plurality of likelihoods to at least one threshold; training a machine learning model for verbal harassment detection using the subset of segments from the second plurality of segments and a plurality of randomly selected segments; and subsequent to the training, training the machine learning model using a third plurality of segments.

The computer-implemented method of the preceding paragraph can include any sub-combination of the following features: where the third plurality of segments comprises at least some segments previously labeled with the occurrence or the non-occurrence of verbal harassment; where the third plurality of segments comprises a number of segments that is larger than a number of segments in at least one of the second plurality of segments or the plurality of randomly selected segments; where the third plurality of segments comprises a number of segments that is larger than a combined number of segments in the second plurality of segments and the plurality of randomly selected segments; where at least one of the first plurality of segments, the second plurality of segments, third plurality of segments, or the plurality of randomly selected segments comprise text data; where text data has been obtained by applying automatic speech recognition to audio data; where a number of segments in the second plurality of segments is larger than a number of segments in the first plurality of segments; where determining the plurality of labels for the second plurality of segments comprises determining more than one label for at least one segment of the second plurality of segments; where aggregating the plurality of labels comprises selecting a single label for the at least one segment of the second plurality of segments; where the plurality of randomly selected segments comprise training data indicative of the non-occurrence of verbal harassment; where the subset of segments from the second plurality of segments comprises training data indicative of the occurrence of verbal harassment; where the at least one threshold is equal to or greater than 0.9; where the segments of the first plurality of segments comprise manually-generated labels; where the subset of segments from the second plurality of segments represents training data indicative of the occurrence of verbal harassment and the plurality of randomly selected segments represents training data indicative of the non-occurrence of verbal harassment; where the machine learning model for verbal harassment detection comprises a text classification machine learning model; and where the text classification machine learning model comprises at least one of hierarchical attention model, a fastText model, or a convolutional neural network model.

Another aspect of the disclosure provides a computer-implemented method of training a machine learning model for detection of verbal harassment. The computer-implemented method comprises: by one or more hardware processors: generating a first set of training data comprising a first plurality of segments by labeling at least some of the segments of the first plurality of segments; training a machine learning model for verbal harassment detection using the first set of training data; and subsequent to completion of training the machine learning model using the first set of training data, training the machine learning model using a second set of training data comprising a second plurality of segments.

The computer-implemented method of the preceding paragraph can include any sub-combination of the following features: where labeling at least some of the segments of the first plurality of segments comprises labeling the segments of the first plurality of segments as comprising an occurrence or a non-occurrence of verbal harassment; and where labeling at least some of the segments of the first plurality of segments incorrectly labels at least one segment of the first plurality of segments.

Another aspect of the disclosure provides a non-transitory computer readable medium storing instructions, which when executed by at least one processor, cause the at least one processor to perform a method of any sub-combination of the features described in the preceding paragraphs.

Another aspect of the disclosure provides a system for training a machine learning model for detection of verbal harassment, the system comprising one or more processors configured to perform a method of any sub-combination of the features described in the preceding paragraphs.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Any of the features of the labeling systems described in Snuba and Snorkel can be utilized by any of the approaches described herein. For example, Snuba can be used by the system 230 shown in FIG. 2. As another example, Snorkel can be used by the label aggregator 250 shown in FIG. 2.

Any of the approaches described herein can utilize any of the features described in any of U.S. Provisional Patent Application No. 62/955,963, titled "Real-Time Verbal Harassment Detection System," filed on Dec. 31, 2019, or U.S. patent application Ser. No. 17/134,912, titled "Real-Time Verbal Harassment Detection System," filed on the same day as the present application, each of which is incorporated by reference in its entirety. For example, any of the approaches described herein can utilize one or more features of audio detection or recording, audio processing, ASR, training data generation, training, or classification described in any of the foregoing patent applications.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims. To reduce the number of claims, certain aspects of the present disclosure are presented below in certain claim forms, but the applicant contemplates other aspects of the present disclosure in any number of claim forms. For example, while only one aspect of the present disclosure is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method of training a machine learning model for detection of verbal harassment, the method comprising:
    by one or more hardware processors:
        determining a plurality of verbal harassment heuristics using a first plurality of segments, the segments of the first plurality of segments previously labeled with an occurrence of verbal harassment or a non-occurrence of verbal harassment;
        determining a plurality of labels for a second plurality of segments by applying the plurality of verbal harassment heuristics and a plurality of verbal harassment patterns, the segments of the second plurality of segments not previously labeled with the occurrence or the non-occurrence of verbal harassment;
        aggregating the plurality of labels into a plurality of likelihoods for the occurrence of verbal harassment;
        selecting a subset of segments from the second plurality of segments based on comparing the plurality of likelihoods to at least one threshold;
        pre-training a machine learning model for verbal harassment detection using the subset of segments from the second plurality of segments and a plurality of randomly selected segments, wherein the subset of segments from the second plurality of segments represents training data indicative of the occurrence of verbal harassment and the plurality of randomly selected segments represents training data indicative of the non-occurrence of verbal harassment; and
        subsequent to the pre-training, updating one or more parameters of the machine learning model using a third plurality of segments.

2. The method of claim 1, wherein the third plurality of segments comprises at least some segments previously labeled with the occurrence or the non-occurrence of verbal harassment.

3. The method of claim 1, wherein the third plurality of segments comprises a number of segments that is larger than a number of segments in at least one of the second plurality of segments or the plurality of randomly selected segments.

4. The method of claim 1, wherein at least one of the first plurality of segments, the second plurality of segments, third plurality of segments, or the plurality of randomly selected segments comprise text data.

5. The method of claim 4, wherein text data has been obtained by applying automatic speech recognition to audio data.

6. The method of claim 1, wherein a number of segments in the second plurality of segments is larger than a number of segments in the first plurality of segments.

7. The method of claim 1, wherein determining the plurality of labels for the second plurality of segments comprises determining more than one label for at least one segment of the second plurality of segments.

8. The method of claim 7, wherein aggregating the plurality of labels comprises selecting a single label for the at least one segment of the second plurality of segments.

9. The method of claim 1, wherein the plurality of randomly selected segments comprise training data indicative of the non-occurrence of verbal harassment.

10. The method of claim 9, wherein the subset of segments from the second plurality of segments comprises training data indicative of the occurrence of verbal harassment.

11. The method of claim 1, wherein the at least one threshold is equal to or greater than 0.9.

12. The method of claim 1, wherein the segments of the first plurality of segments comprise manually-generated labels.

13. The method of claim 1, wherein the machine learning model for verbal harassment detection comprises a text classification machine learning model.

14. The method of claim 13, wherein the text classification machine learning model comprises at least one of hierarchical attention model, a fastText model, or a convolutional neural network model.

15. A computer-implemented method of training a machine learning model for detection of verbal harassment, the method comprising:
by one or more hardware processors:
generating a first set of training data comprising a first plurality of segments by labeling at least some of the segments of the first plurality of segments;
pre-training a machine learning model for verbal harassment detection using a subset of segments from the first set of training data and a plurality of randomly selected segments from the first set of training data, wherein the subset of segments from the first set of training data represents training data indicative of a occurrence of verbal harassment and the plurality of randomly selected segments represents training data indicative of a non-occurrence of verbal harassment; and
subsequent to completion of pre-training the machine learning model using the subset of segments from the first set of training data, updating one or more parameters of the machine learning model using a second set of training data comprising a second plurality of segments.

16. The method of claim 15, wherein labeling at least some of the segments of the first plurality of segments comprises labeling the segments of the first plurality of segments as comprising an occurrence or a non-occurrence of verbal harassment.

17. The method of claim 16, wherein labeling at least some of the segments of the first plurality of segments incorrectly labels at least one segment of the first plurality of segments.

18. The method of claim 15, wherein the second set of training data comprises at least some segments previously labeled with an occurrence or a non-occurrence of verbal harassment.

19. The method of claim 15, wherein pre-training a machine learning model for verbal harassment detection comprises further using a plurality of randomly selected segments.

20. The method of claim 15, wherein at least some segments of the first plurality of segments are labelled with manually-generated labels.

* * * * *